US012613486B2

(12) United States Patent
Kojima

(10) Patent No.: US 12,613,486 B2
(45) Date of Patent: Apr. 28, 2026

(54) EXTENDED OPERATION APPARATUS ATTACHABLE TO AN IMAGE FORMING APPARATUS

(71) Applicant: Reo Kojima, Kanagawa (JP)

(72) Inventor: Reo Kojima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/697,171

(22) PCT Filed: Sep. 8, 2022

(86) PCT No.: PCT/IB2022/058442
§ 371 (c)(1),
(2) Date: Mar. 29, 2024

(87) PCT Pub. No.: WO2023/118982
PCT Pub. Date: Jul. 29, 2023

(65) Prior Publication Data

US 2025/0004410 A1 Jan. 2, 2025

(30) Foreign Application Priority Data

Dec. 23, 2021 (JP) ................................ 2021-209315

(51) Int. Cl.
*G03G 15/00* (2006.01)
*G03G 21/16* (2006.01)

(52) U.S. Cl.
CPC ..... *G03G 15/5016* (2013.01); *G03G 21/1647* (2013.01)

(58) Field of Classification Search
CPC ........... G03G 15/5016; G03G 21/1642; G03G 21/1647
See application file for complete search history.

(56) References Cited

U.S. PATENT DOCUMENTS

| | | | | |
|---|---|---|---|---|
| 5,187,468 | A | 2/1993 | Garthwaite et al. | |
| 5,881,333 | A * | 3/1999 | Takahashi ............ | G03G 15/221 399/90 |
| 6,972,945 | B1 | 12/2005 | Kozak et al. | |
| 2007/0076379 | A1 | 4/2007 | Hong et al. | |

(Continued)

FOREIGN PATENT DOCUMENTS

JP 2021-086035 A 6/2021

OTHER PUBLICATIONS

International Search Report and Written Opinion issued on Nov. 21, 2022 in PCT/IB2022/058442 filed on Sep. 8, 2022.

*Primary Examiner* — Hoang X Ngo
(74) *Attorney, Agent, or Firm* — Harness, Dickey & Pierce, P.L.C.

(57) ABSTRACT

An extended operation unit attachable to an attachment face of an operation unit of an apparatus body in an attachment direction perpendicular to the attachment face includes a pair of projecting portions and a grip portion disposed between the pair of projecting portions. The pair of projecting portions is engageable with a pair of positioning holes of the attachment face of the operation unit. The grip portion extends in the attachment direction beyond end portions of the pair of projecting portions. The grip portion sandwiches and grips, from front and back in the attachment direction, a gripped portion disposed inside the operation unit.

20 Claims, 4 Drawing Sheets

(56) References Cited

U.S. PATENT DOCUMENTS

| | | | | |
|---|---|---|---|---|
| 2011/0181903 | A1* | 7/2011 | Katsuyama .......... | H04N 1/0035 358/1.14 |
| 2020/0249888 | A1* | 8/2020 | Kurita .................. | H04N 1/0083 |
| 2020/0371548 | A1 | 11/2020 | Lund et al. | |
| 2021/0168246 | A1* | 6/2021 | Kamei ............... | H04N 1/00559 |

* cited by examiner

EXTENDED OPERATION APPARATUS ATTACHABLE TO AN IMAGE FORMING APPARATUS

CROSS-REFERENCE TO RELATED APPLICATIONS

This application is a national phase under 35 U.S.C. § 371 of PCT International Application No. PCT/IB2022/058442 which has an International filing date of Sep. 8, 2022, which claims priority to Japanese Application No. 2021-209315, filed Dec. 23, 2021, the entire contents of each of which are hereby incorporated by reference.

TECHNICAL FIELD

Embodiments of the present disclosure relate to an extended operation unit such as a numeric keypad that is removably attachable to a control panel of, for example, an image forming apparatus and an image forming apparatus to which the extended operation unit is attached.

BACKGROUND ART

An extended operation unit such as a numeric keypad is removably attached as an option to some image forming apparatuses such as copiers, printers, facsimiles, or multifunction peripherals having at least two of copying, printing, and facsimile functions.

For example, Patent Literature (PTL) 1 (Japanese Unexamined Patent Application Publication No. 2021-086035) discloses an image forming apparatus that includes a numeric keypad as an extended operation unit removably attached to a side end of a control panel disposed at an upper front of the image forming apparatus. The numeric keypad includes a pair of insertion pins and one hook disposed between the pair of insertion pins.

The pair of insertion pins is inserted into a pair of pin insertion holes at the side end of the control panel while the hook is engaged with an engaged part inside the control panel through a hook hole at the side end of the control panel. Thus, the numeric keypad is attached to the control panel.

CITATION LIST

Patent Literature

[PTL 1]
Japanese Unexamined Patent Application Publication No. 2021-086035

SUMMARY OF INVENTION

Technical Problem

However, since the insertion pins of the numeric keypad are elongated in the lateral direction, the numeric keypad is easily inclined when an external force is unexpectedly applied to the insertion pins. In addition, the insertion pins are easily inclined due to variation in tolerance of components. When the insertion pins are inclined, the insertion pins are hardly inserted into the pin insertion holes of the control panel.

Further, in order to firmly support the insertion pins with the numeric keypad to prevent the elongated insertion pins from being easily inclined, respective base end portions of the insertion pins are to be extended deeply into the numeric keypad. However, in this case, an internal space of the numeric keypad is occupied by the base end portions of the insertion pins, resulting in reduction of a space in which the components of the numeric keypad are disposed. The elongated insertion pins also create a dead space in the control panel.

In light of the above-described problems, it is an object of the present invention to provide an extended operation unit that maintains a strength sufficient to be attached to an operation unit of an apparatus body without elongated insertion pins.

Solution to Problem

An extended operation unit attachable to an attachment face of an operation unit of an apparatus body in an attachment direction perpendicular to the attachment face includes a pair of projecting portions and a grip portion disposed between the pair of projecting portions.

The pair of projecting portions is engageable with a pair of positioning holes of the attachment face of the operation unit. The grip portion extends in the attachment direction beyond end portions of the pair of projecting portions. The grip portion sandwiches and grips, from front and back in the attachment direction, a gripped portion disposed inside the operation unit.

An image forming apparatus includes the extended operation unit that is removable.

Advantageous Effects of Invention

According to one aspect of the present disclosure, an extended operation unit maintains a strength sufficient to be attached to an operation unit of an apparatus body without elongated insertion pins.

BRIEF DESCRIPTION OF DRAWINGS

A more complete appreciation of the embodiments and many of the attendant advantages and features thereof can be readily obtained and understood from the following detailed description with reference to the accompanying drawings.

Figure 1:
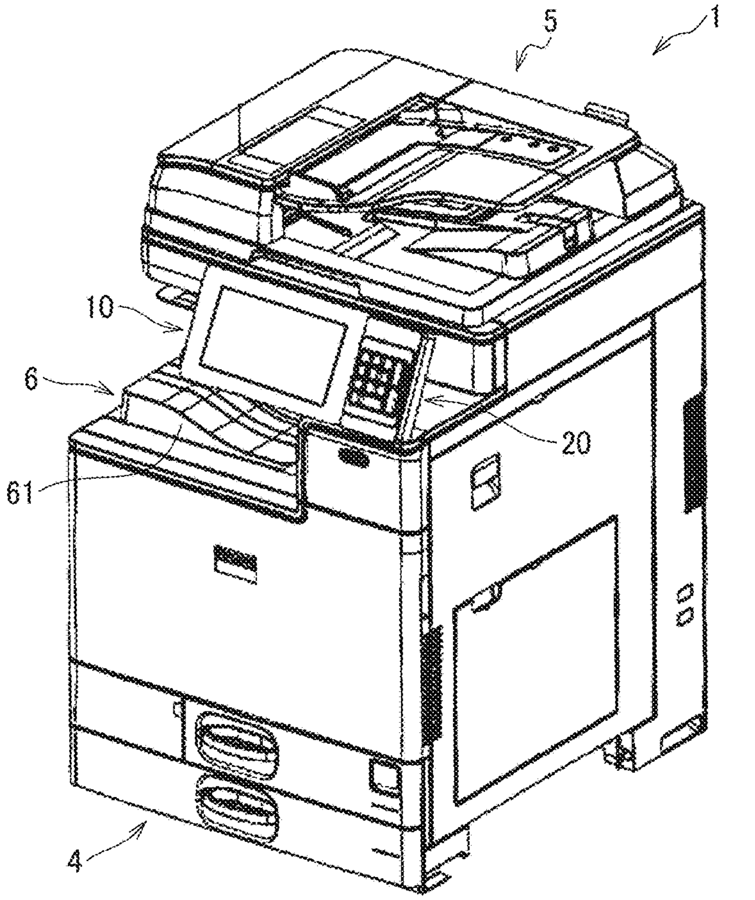
FIG. 1 is a perspective view of an image forming apparatus according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise. For the sake of simplicity, like reference numerals are given to identical or corresponding constituent elements such as parts and materials having the same functions, and redundant descriptions thereof are simplified or omitted unless otherwise required.

Now, a description is given of the overall configuration of an image forming apparatus according to an embodiment of the present disclosure. FIG. 1 is a perspective view of an image forming apparatus 1 as an apparatus body according to the present embodiment. The image forming apparatus 1 is a multifunction peripheral having functions of, for example, a printer, a facsimile, and a copier. Note that the image forming apparatus 1 may have any one of these functions or any combination of these functions.

The image forming apparatus 1 includes a sheet feeding unit 4, a document reading unit 5, and a sheet ejection unit 6. The sheet feeding unit 4 includes, for example, an input tray. The sheet ejection unit 6 includes, for example, an output tray 61. The image forming apparatus 1 further includes, for example, an image bearer, a transfer unit, and a fixing device inside the image forming apparatus 1.

As a printing operation starts, a sheet as a recording medium is supplied from the sheet feeding unit 4 into the image forming apparatus 1. Then, an image is transferred to the image bearer in an image forming process according to image data of a print job.

The image is transferred from the image bearer onto the sheet conveyed through a conveyance passage. The sheet bearing the transferred image is conveyed to the fixing device, which fixes toner of the image on the sheet. The sheet bearing the fixed image is output to the output tray 61.

Figure 2:
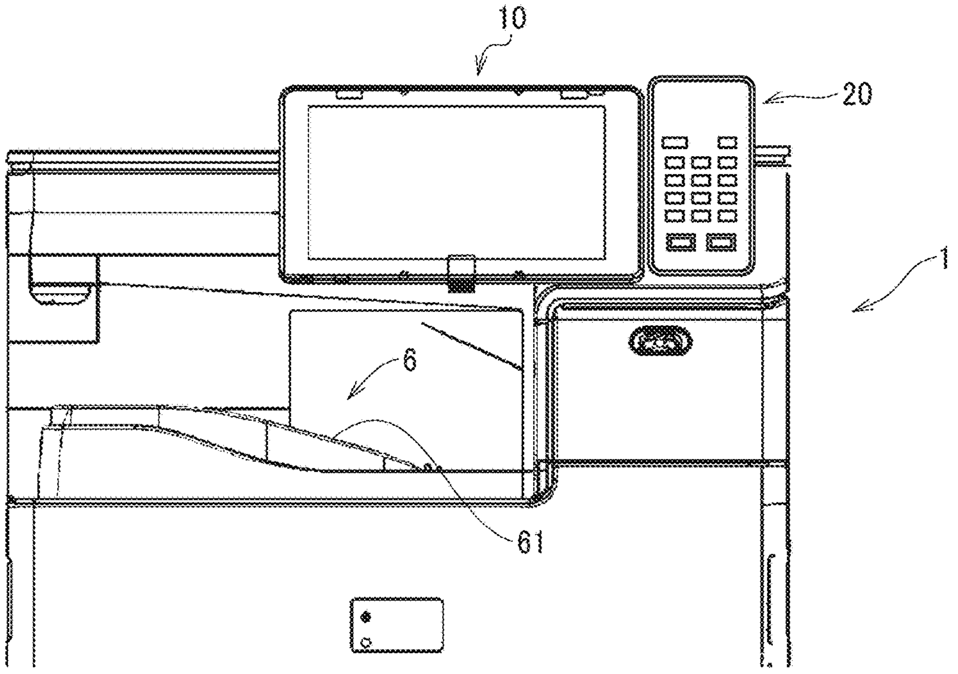
FIG. 2 is a partial front view of the image forming apparatus to which a numeric keypad is attached.

As illustrated in FIG. 2, a control panel 10 as an operation unit on the apparatus body is disposed at an upper front of the image forming apparatus 1. The control panel 10 is an operation unit for an operator to input, for example, a print command. The control panel 10 employs a touch panel system in the present embodiment. In an alternative embodiment of the present disclosure, the control panel 10 may employ a button system.

A numeric keypad 20 as an extended operation unit or a function expansion device is removably attached to the control panel 10. Current control panels often employ the touch panel system. However, such control panels employing the touch panel system may fail to provide a sufficient operational feeling or may require several steps of operations to display numbers 0 to 9 on the panel and allow the numbers 0 to 9 to be input.

An operator who is not familiar with the touch panel system may prefer the numeric keypad 20, which is a physical switch. Accordingly, the numeric keypad 20 optionally attached to the control panel 10 enhances the operability of the control panel 10 of the image forming apparatus 1.

The numeric keypad 20 and the control panel 10 have substantially the same length in the vertical direction (i.e., the length of the numeric keypad 20 in a longitudinal direction of the numeric keypad 20). When the numeric keypad 20 is attached to the control panel 10, a panel face of the control panel 10 and a body face of the numeric keypad 20 are at substantially the same height. At least one of such arrangements enhances the design of the operation unit disposed at the body front of the image forming apparatus 1 when the numeric keypad 20 is attached.

The control panel 10 has a side provided with a pair of positioning holes 11 and a laterally elongated opening 13.

In addition, for example, a universal serial bus (USB) insertion hole is disposed on the side of the control panel 10. The pair of positioning holes 11 is a pair of holes into which a pair of projecting portions 21 described below is fitted. The laterally elongated opening 13 is an opening through which a pair of grip portions G described below is inserted into the control panel 10.

Figure 3:
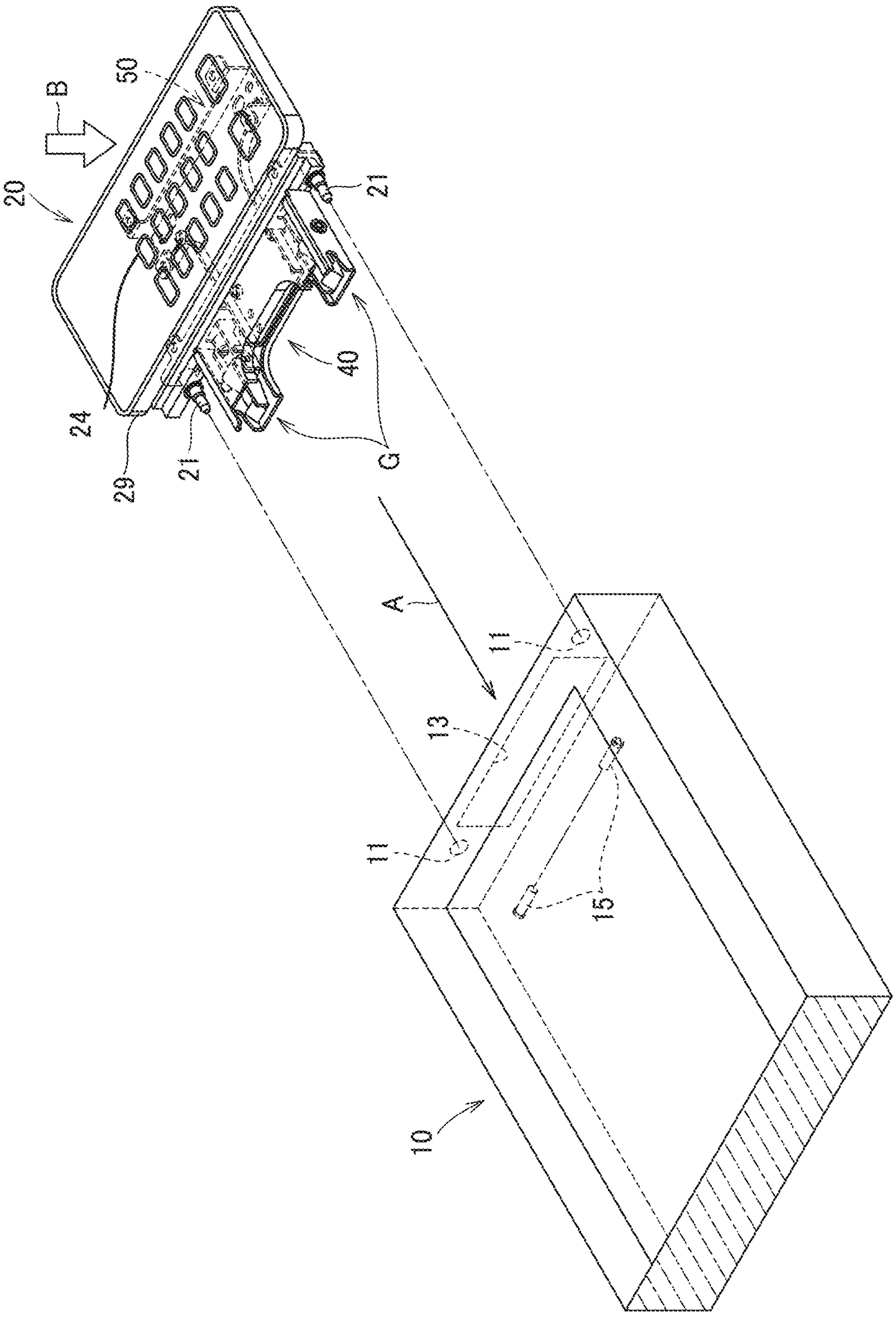
FIG. 3 is a perspective view of the numeric keypad before being attached to a control panel.

Now, a detailed description is given of the numeric keypad 20. As illustrated in FIG. 3, the numeric keypad 20 includes a body portion 29, the pair of projecting portions 21, and the pair of grip portions G, and numeric keys 24. The pair of projecting portions 21 and the pair of grip portions G are included in a first metal fitting 40 as described later and are attached to one side of the body portion 29 via a second metal fitting 50. The two metal fittings 40 and 50 are used to easily couple various types of numeric keys 24 to the control panel 10 by changing the shape of a trailing end portion of the second metal fitting 50.

The numeric keys 24 are disposed on an upper side of the body portion 29. The upper side is an operation side of the numeric keypad 20. A longitudinal direction and a short direction of the body portion 29 are parallel to the operation side. An operator presses the numeric keys 24 in a pressing direction B.

Now, a description is given of the pair of projecting portions 21. Each of the projecting portions 21 in a cylindrical shape has an end portion including a tapered face 21*a* that is tapered toward a distal end of each of the pair of projecting portions 21. The tapered face 21*a* facilitates insertion and fitting of the pair of projecting portions 21 into the pair of positioning holes 11 of the control panel 10.

Each of the projecting portions 21 is a metal member. When the numeric keypad 20 is electrically connected to the control panel 10 with the pair of projecting portions 21 inserted into the pair of positioning holes 11 of the control panel 10, grounding is ensured through the pair of projecting portions 21 as a pair of conductors.

The pair of projecting portions 21 extends in the short direction of the body portion 29 (i.e., an attachment direction A in which the numeric keypad 20 is attached to the control panel 10). In other words, each of the projecting portions 21 extends in a direction parallel to the upper side of the body portion 29 on which the numeric keys 24 is disposed and in a direction intersecting the longitudinal direction of the body portion 29.

The pair of projecting portions 21 are aligned in the longitudinal direction of the body portion 29. The pair of projecting portions 21 are disposed symmetrically across a longitudinal center position of the body portion 29. Particularly in the present embodiment, one of the projecting portions 21 is disposed near one longitudinal end side of the body portion 29 whereas the other one of the projecting portions 21 is disposed near the other longitudinal end side of the body portion 29.

Now, a description is given of the pair of grip portions G. The grip portions G are disposed as a symmetrical pair in the longitudinal direction of the body portion 29. In other words, the grip portions G are aligned in pair between the pair of projection portions 21 in a direction parallel to a direction in which the pair of projecting portions 21 are aligned. In other words, the symmetrical pair of grip portions G are disposed symmetrically across the longitudinal center position of the body portion 29 between the pair of projecting portions 21. The pair of grip portions G extends in the attachment direction A beyond the end portions of the pair of projecting portions 21. The pair of grip portions G can sandwich and grip, from the front and back in the attachment direction A, a pair of gripped pins 15 as a pair of gripped portions disposed inside the control panel 10. The pair of grip portions G thus disposed as a symmetrical pair allows the numeric keypad 20 to be coupled to the control panel 10 with an increased coupling force.

Figure 4:
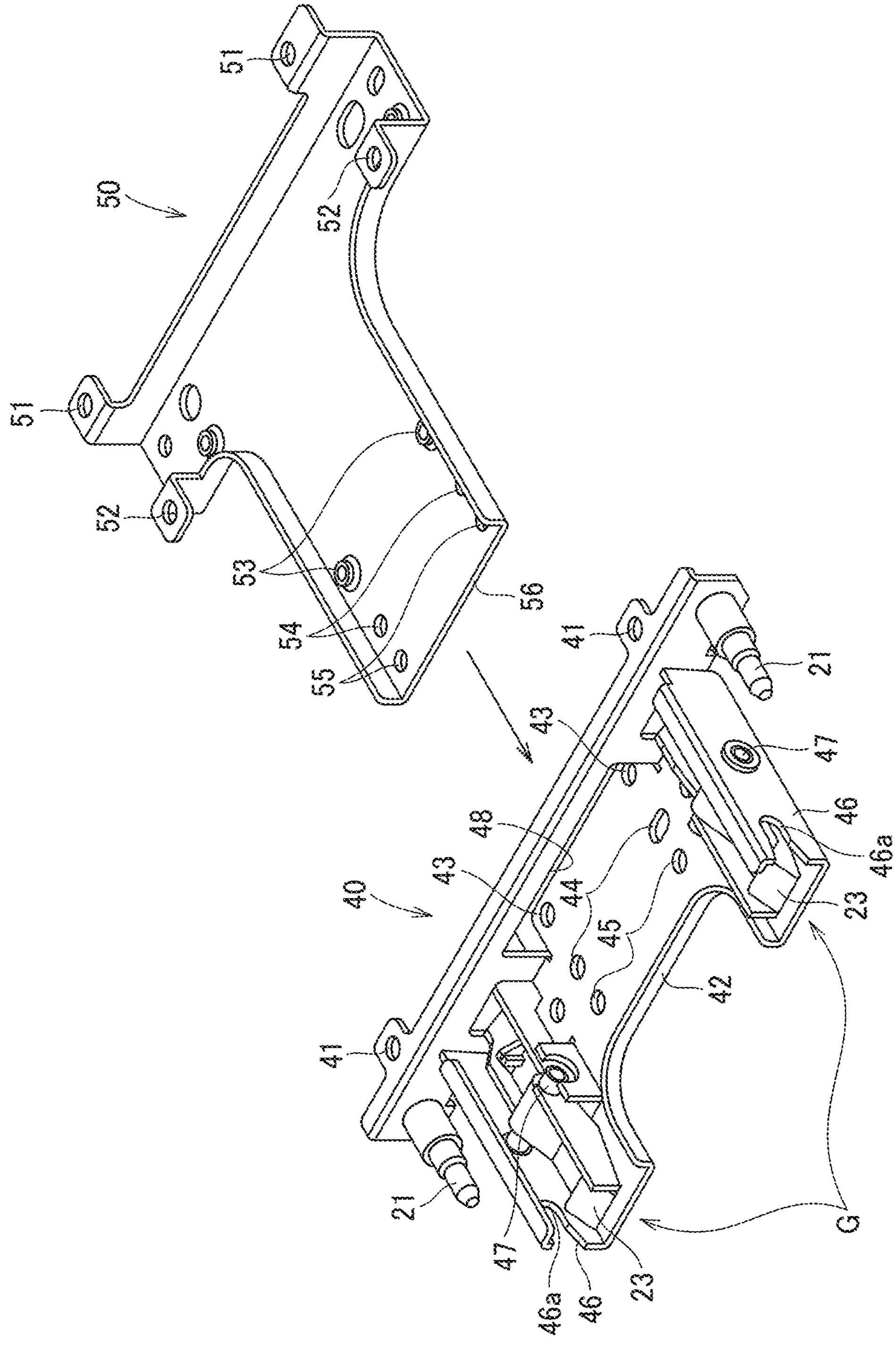
FIG. 4 is an exploded perspective view of a first fitting and a second fitting that are externally attached to a body portion of the numeric keypad.

As illustrated in FIG. 4, the pair of projecting portions 21 and the pair of grip portions G are included in the first metal fitting 40 that is externally attached to the body portion 29 of the numeric keypad 20. The first metal fitting 40 is made of a laterally elongated sheet metal. The pair of projecting portions 21 is fixed to the opposed longitudinal ends of the first metal fitting 40.

An extending portion 56 of the second metal fitting 50 is inserted into an opening 48 of the first metal fitting 40 in a direction indicated by arrow in FIG. 4. Then, screw holes 43 to 45 are aligned with screw holes 53 to 55 to couple the metal fittings 40 and 50 to each other with screws. Thus, the metal findings 40 and 50 are integrated with each other. When the second metal fitting 50 is inserted in the direction indicated by arrow in FIG. 4, an end portion of the extending portion 56 of the second metal fitting 50 contacts a rising portion 42 of the first metal fitting 40, so that the screw holes 43 to 45 are aligned with the screw holes 53 to 55. In short, the screw holes 43 to 45 are easily aligned with the screw holes 53 to 55.

After the first metal fitting 40 and the second metal fitting 50 are coupled to each other with screws, screws are inserted into screw holes 51 and 52 of the second metal fitting 50 and screwed into a lower side of the numeric keypad 20. On the other hand, screws are inserted into screw holes 41 of the first metal fitting 40 and screwed into the upper side of the numeric keypad 20. Thus, the pair of projecting portions 21 and the pair of grip portions G are included in the numeric keypad 20 via the first metal fitting 40 and the second metal fitting 50.

The first metal fitting 40 includes a symmetrical pair of arm portions 46 projecting forward (in the attachment direction A) between the pair of projecting portions 21. The pair of arm portions 46 is provided with the pair of grip portions G. Each of the grip portions G includes a hook member 23 that can be engaged with the gripped pin 15 from the front in the attachment direction A in FIG. 3, an elastic biasing member such as a spring that biases the hook member 23 in an engagement direction to engage the hook member 23 with the gripped pin 15, a receiving portion 46*a* that fits over the gripped pin 15 from the back in the attachment direction A, and an inclined portion 46*b* at an entrance of the receiving portion 46*a*.

The receiving portion 46*a* is a semicircular arc-shaped concave portion formed at an end portion of the arm portion 46. The inclined portion 46*b* smoothly guides the gripped pin 15 into the receiving portion 46*a*.

Figure 5:
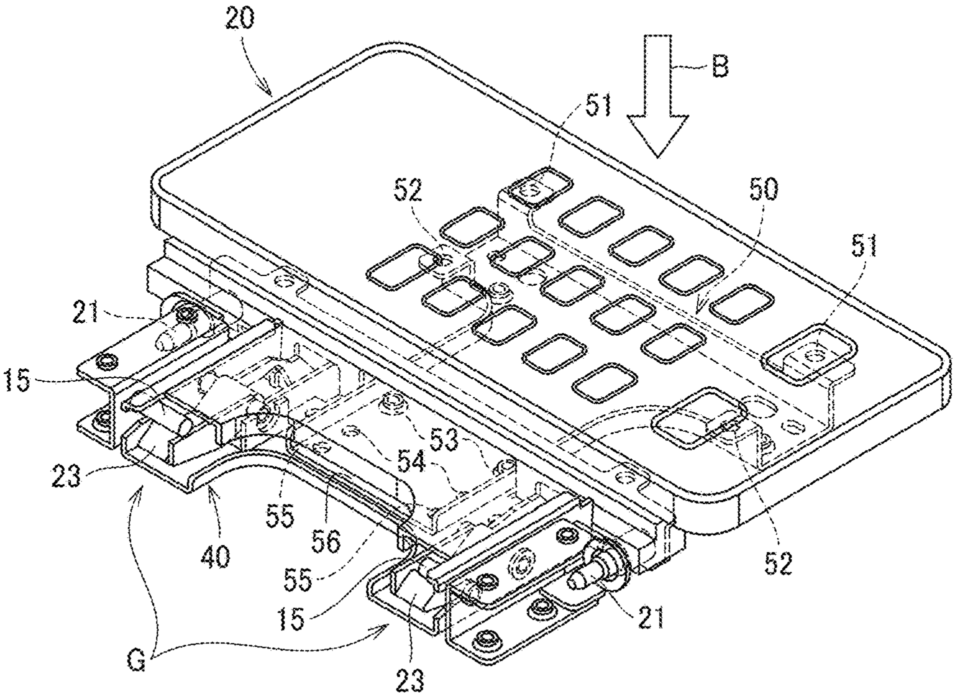
FIG. 5 is a perspective view of the numeric keypad after being attached to the control panel.

Now, a description is given of attachment of the numeric keypad 20. FIG. 5 is a view of the numeric keypad 20 attached to the control panel 10. To simplify the illustration, FIG. 5 illustrates part of the control panel 10. Specifically, FIG. 5 illustrates only frame portions of the control panel 10 that support the pair of projecting portions 21 and the peripheral structure including the pair of gripped pins 15.

As illustrated in FIG. 5, the pair of projecting portions 21 is inserted into the pair of positioning holes 11 of the control panel 10.

As the pair of projecting portions 21 contacts the frame portions inside the control panel 10, the load of the numeric keypad 20 is supported by the control panel 10.

Figure 6:
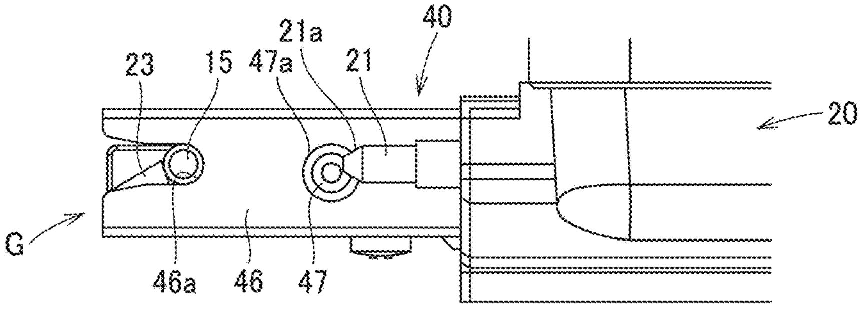
FIG. 6 is a partial side view of the numeric keypad of FIG. 5.

As illustrated in FIGS. 5 and 6, the projecting portion 21 is significantly shorter in the attachment direction A than an insertion pin depicted in PTL 1 (Japanese Unexamined Patent Application Publication No. 2021-086035). Typical insertion pins are elongated in the attachment direction A of the numeric keypad 20. Base end portions of the typical insertion pins extend deep inside the numeric keypad 20. Specifically, the typical insertion pins have a total length of at least 12 cm to 15 cm.

By contrast, in one or more embodiments of the present disclosure, the projecting portion 21 has a total length of 2 cm to 3 cm at most. The length (2 cm to 3 cm) is about one fifth of the length (12 cm to 15 cm) of the typical insertion pins. The projecting portion 21 having such an extremely short total length hardly creates a dead space in the control panel 10.

In addition, since the base end portion of the projecting portion 21 does not extend into the numeric keypad 20, the internal space of the numeric keypad 20 is not sacrificed. Further, the projecting portion 21 is not bent or inclined by an unexpectedly acting external force.

The arm portion 46 has a pivot portion 47. The hook member 23 is supported by the pivot portion 47 such that the hook members 23 can rotate in the vertical direction in FIG. 6 (i.e., a direction indicated by arrow in FIG. 7). The hook member 23 is rotationally biased clockwise in FIGS. 6 and 7 about the pivot portion 47 by a biasing member. The biasing member may be, for example, a torsion spring 47*a* wound around the pivot portion 47.

A first inclined portion 23*a* and a second inclined portion 23*b* are formed at an end portion of the hook member 23.

When the hook member 23 moves in the attachment direction A toward the gripped pin 15, the first inclined portion 23*a* contacts the gripped pin 15 and moves the hook member 23 in a direction opposite the engagement direction against the biasing member. When the biasing member moves the hook member 23 in the engagement direction after the gripped pins 15 rides over the first inclined portion 23*a*, the second inclined portion 23*b* contacts the gripped pin 15 and moves the hook member 23 in the attachment direction A.

Figure 7:
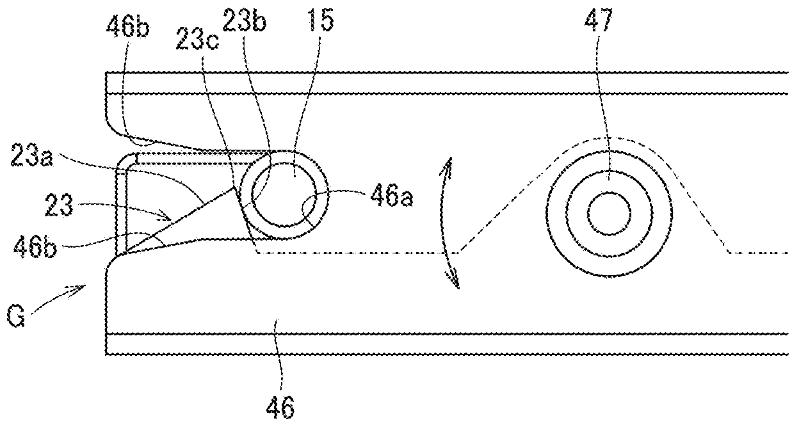
FIG. 7 is an enlarged side view of a hook portion of the numeric keypad of FIG. 6.

In FIG. 7, the first inclined portion 23*a* has a gentle forward-downward inclination in the attachment direction A whereas the second inclined portion 23*b* has a steep forward-upward inclination in the attachment direction A. The first inclined portion 23*a* and the second inclined portion 23*b* are adjacent to each other in the attachment direction A of the numeric keypad 20. A boundary between the first inclined portion 23*a* and the second inclined portion 23*b* is a vertex 23*c* of the hook member 23.

The receiving portion 46*a* of the arm portion 46 described above is located behind the vertex 23*c* of the hook member 23. When the movement of the numeric keypad 20 in the attachment direction A of FIG. 3 is completed, the receiving portion 46*a* receives the gripped pin 15 disposed inside the control panel 10 as illustrated in FIGS. 6 and 7.

The hook member 23 is rotated and returned upward about the pivot portion 47 by the biasing member while the gripped pin 15 is received as illustrated in FIGS. 6 and 7. Thus, the gripped pin 15 is sandwiched between the second inclined portion 23*b* of the hook member 23 and the receiving portion 46*a*. The gripped pin 15 thus held does not move in a removal direction in which the numeric keypad 20 is removed (i.e., a direction opposite the attachment direction A).

Since the gripped pin 15 is sandwiched between the second inclined portion 23*b* and the receiving portion 46*a* while the resilient force of the biasing member acts on the gripped pin 15 at the second inclined portion 23*b*, the hook member 23 and therefore the numeric keypad 20 are pulled in the attachment direction A. Thus, the gripped pin 15 is sandwiched and held from the front and back in the attachment direction A by the hook member 23 and the receiving portion 46*a*.

The numeric keypad 20 and the control panel 10 are thus coupled to each other in good conditions prevent rattling of the numeric keypad 20 particularly in the attachment direction A. Since the gripped pin 15 is fitted to the semicircular arc-shaped receiving portion 46*a* while the pair of projecting portions 21 is fitted to the pair of positioning holes 11, the rattling of the numeric keypad 20 in the vertical and lateral directions is also prevented.

As described above, in the present embodiment, the numeric keypad 20 is attached to the control panel 10 in good conditions without rattling simply by inserting the projecting portion 21 into the positioning hole 11 in the attachment direction A and engaging the hook member 23 with the gripped pin 15. Such a configuration renders an operation such as screwing unnecessary and facilitates attachment and removal of the numeric keypad 20 to and from the control panel 10.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. For example, the image forming apparatus of the embodiments of the present disclosure is not limited to an electrophotographic image forming apparatus, and may be, for example, an inkjet image forming apparatus. In the present embodiment, a button-type numeric keypad has been described as an extended operation unit. However, in an alternative embodiment of the present disclosure, the extended operation unit may be a touch-panel numeric input device.

The extended operation unit is not limited to a numeric keypad, and may be, for example, an authentication device such as an integrated circuit (IC) card reader or a keyboard. Examples of the recording medium include, but are not limited to, plain paper, thick paper, a postcard, an envelope, thin paper, coated paper, art paper, tracing paper, an overhead projector (OHP) transparency, a plastic film, prepreg, and copper foil. Although the pair of grip portions G is disposed as a symmetrical pair in the embodiment described above, a single grip portion G may be disposed at a longitudinal center portion of the numeric keypad 20 (i.e., an intermediate portion between the pair of projecting portions 21).

This patent application is based on and claims priority to Japanese Patent Application No. 2021-209315, filed on Dec. 23, 2021, in the Japan Patent Office, the entire disclosure of which is hereby incorporated by reference herein.

REFERENCE SIGNS LIST

1: Image forming apparatus
4: Sheet feeding unit
5: Document reading unit
6: Sheet ejection unit
10: Control panel
11: Positioning hole
13: Opening
15: Gripped pin
20: Numeric keypad
21: Projecting portion
21*a*: Tapered face
23: Hook member
23*a*: First inclined portion
23*b*: Second inclined portion
23*c*: Vertex
24: Numeric key
29: Body portion
40: First metal fitting
41, 43 to 45: Screw holes
42: Rising portion
46: Arm portion
46*a*: Receiving portion
46*b*: Inclined portion
47: Pivot portion
48: Opening
50: Second metal fitting
51 to 55: Screw holes
56: Extending portion
61: Output tray
A: Attachment direction
B: Pressing direction
G: Grip portion

The invention claimed is:

1. An extended operation apparatus configured to be attachable to an attachment face of an operation apparatus of an apparatus body, the extended operation apparatus attachable to the attachment face in an attachment direction perpendicular to the attachment face, the extended operation apparatus comprising:
- a pair of projecting portions configured to be engageable with a pair of positioning holes of the attachment face of the operation apparatus; and
- a first grip portion between the pair of projecting portions,
  - the first grip portion extending in the attachment direction beyond end portions of the pair of projecting portions, and
  - the first grip portion being configured to sandwich and grip, from front and back in the attachment direction, a gripped portion inside the operation apparatus.

2. The extended operation apparatus according to claim 1, further comprising:
- a second grip portion,
- wherein the first grip portion and the second grip portion are aligned as a pair between the pair of projection portions in a direction parallel to a direction in which the pair of projecting portions are aligned.

3. The extended operation apparatus according to claim 1, wherein each of the pair of projecting portions has an end portion including a tapered face tapered toward a distal end of the each of the pair of projecting portions.

4. The extended operation apparatus according to claim 1, wherein the first grip portion includes:
- a hook member engageable with the gripped portion from the front in the attachment direction;
- a biasing member configured to bias the hook member in an engagement direction to engage the hook member with the gripped portion; and
- a receiving portion configured to fit over the gripped portion from the back in the attachment direction.

5. The extended operation apparatus according to claim 4, wherein the hook member includes:

a first inclined portion configured to contact the gripped portion and move the hook member in a direction opposite the engagement direction against the biasing member in response to the hook member moving in the attachment direction toward the gripped portion; and a second inclined portion configured to contact the gripped portion and move the hook member in the attachment direction in response to the biasing member moving the hook member in the engagement direction after the gripped portion rides over the first inclined portion.

6. The extended operation apparatus according to claim 1, further comprising:

a numeric keypad, an authentication device, or any combinations thereof.

7. The extended operation apparatus according to claim 1, further comprising:

a body portion;

a first metal fitting including the pair of projecting portions and the first grip portion; and a second metal fitting removably coupled to the first metal fitting, the second metal fitting configured to be removably attached to the body portion.

8. An image forming apparatus comprising the extended operation apparatus according to claim 1, wherein the extended operation apparatus is configured to be removable.

9. The image forming apparatus according to claim 8, wherein the gripped portion is a gripped pin extending in a direction parallel to a direction in which the pair of positioning holes are aligned.

10. An extended operation apparatus configured to be attachable to an attachment face of an operation apparatus of an apparatus body, the extended operation apparatus attachable to the attachment face in an attachment direction perpendicular to the attachment face, the extended operation apparatus comprising:

a pair of projecting portions configured to be engageable with a pair of positioning holes of the attachment face of the operation apparatus; and a first grip portion, the first grip portion extending in the attachment direction beyond end portions of the pair of projecting portions, and the first grip portion being configured to sandwich and grip, from front and back in the attachment direction, a gripped portion inside the operation apparatus.

11. The extended operation apparatus according to claim 10, wherein the first grip portion includes a positioning portion configured to position the first grip portion in a direction perpendicular to the attachment direction and a direction in which the pair of positioning holes are aligned.

12. The extended operation apparatus according to claim 11, wherein the positioning portion includes an inclined portion at an entrance of the positioning portion; and the positioning portion is configured to fit over a gripped pin in the attachment direction, the gripped pin extending in a direction parallel to a direction in which the pair of positioning holes are aligned.

13. The extended operation apparatus according to claim 10, wherein the first grip portion is between the pair of projecting portions.

14. The extended operation apparatus according to claim 10, further comprising:

a second grip portion, wherein the first grip portion and the second grip portion are aligned as a pair between the pair of projection portions in a direction parallel to a direction in which the pair of projecting portions are aligned.

15. The extended operation apparatus according to claim 10, wherein each of the pair of projecting portions has an end portion including a tapered face tapered toward a distal end of the each of the pair of projecting portions.

16. The extended operation apparatus according to claim 10, wherein the first grip portion includes:

a hook member engageable with the gripped portion from the front in the attachment direction;

a biasing member configured to bias the hook member in an engagement direction to engage the hook member with the gripped portion; and a receiving portion configured to fit over the gripped portion from the back in the attachment direction.

17. The extended operation apparatus according to claim 10, further comprising:

a numeric keypad, an authentication device, or any combinations thereof.

18. The extended operation apparatus according to claim 10, further comprising:

a body portion;

a first metal fitting including the pair of projecting portions and the first grip portion; and a second metal fitting removably coupled to the first metal fitting, the second metal fitting configured to be removably attached to the body portion.

19. An image forming apparatus comprising the extended operation apparatus according to claim 10, wherein the extended operation apparatus is configured to be removable.

20. The image forming apparatus according to claim 19, wherein the gripped portion is a gripped pin extending in a direction parallel to a direction in which the pair of positioning holes are aligned.

* * * * *